(12) United States Patent
Chen et al.

(10) Patent No.: US 10,331,932 B2
(45) Date of Patent: Jun. 25, 2019

(54) OPTICAL SENSOR DEVICE AND A FINGERPRINT SENSOR APPARATUS

(71) Applicant: Novatek Microelectronics Corp., Hsinchu (TW)

(72) Inventors: I-Hsiu Chen, Taipei (TW); Shu-Fang Wang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 56 days.

(21) Appl. No.: 15/176,152

(22) Filed: Jun. 8, 2016

(65) Prior Publication Data

US 2017/0357840 A1 Dec. 14, 2017

(51) Int. Cl.
*G06K 9/00* (2006.01)
*G02B 5/20* (2006.01)
*G02B 3/00* (2006.01)

(52) U.S. Cl.
CPC ....... *G06K 9/00013* (2013.01); *G02B 3/0056* (2013.01); *G02B 5/201* (2013.01)

(58) Field of Classification Search
CPC ....... G06K 2009/0006; G06K 9/00013; G06K 9/0004; H01L 27/323; H01L 27/14623; H01L 27/14627; H01L 27/14678; H01L 27/3234
USPC .......................................................... 382/124
See application file for complete search history.

(56) References Cited

U.S. PATENT DOCUMENTS

| | | | |
|---|---|---|---|
| 7,897,903 B2 | 3/2011 | Duparre et al. | |
| 9,559,239 B2* | 1/2017 | Yamamoto | G06F 1/00 |
| 9,647,025 B2* | 5/2017 | Watanabe | H01L 27/14645 |
| 9,911,773 B2* | 3/2018 | Yang | H01L 27/14621 |
| 9,955,090 B2* | 4/2018 | Yang | H04N 5/35563 |
| 2009/0016578 A1* | 1/2009 | Yamamoto | G06K 9/00013 382/124 |
| 2010/0067757 A1* | 3/2010 | Arai | G06K 9/0004 382/128 |
| 2012/0257031 A1* | 10/2012 | Tsuchiya | G06K 9/0004 348/77 |
| 2015/0021627 A1* | 1/2015 | Fujita | H01L 33/005 257/82 |
| 2016/0372507 A1* | 12/2016 | Yang | H01L 27/14621 |
| 2017/0357840 A1* | 12/2017 | Chen | G06K 9/00013 |

OTHER PUBLICATIONS

Tanida et al., "Thin Observation Module by Bound Optics (TOMBO): Concept and Experimental Verification," Applied Optics, Apr. 2001, pp. 1806-1813.

* cited by examiner

*Primary Examiner* — Iman K Kholdebarin
(74) *Attorney, Agent, or Firm* — JCIPRNET (57) ABSTRACT

The optical sensor device including a sensor layer, a microlens layer and a filter layer is provided. The sensor layer includes a plurality of sensor areas, and is configured to sense a multi-wavelength light from a finger. The microlens layer includes a plurality of microlenses arranged in an array, and is disposed on the sensor layer. Each of the microlenses focuses the multi-wavelength light on a corresponding one of the sensor areas. The filter layer is disposed between the sensor layer and the microlens layer, and configured to filter the multi-wavelength light to generate a plurality of lights with different wavelengths. In addition, the fingerprint sensor apparatus including the foregoing optical sensor device is also provided.

13 Claims, 10 Drawing Sheets

OPTICAL SENSOR DEVICE AND A FINGERPRINT SENSOR APPARATUS

BACKGROUND OF THE INVENTION

1. Field of the Invention

The invention generally relates to an optical sensor device and a fingerprint sensor apparatus, in particular, to an optical sensor device and a fingerprint sensor apparatus capable of providing good sensing quality.

2. Description of Related Art

Optical devices such as optical fingerprint collection devices are widely used for fingerprint collection and identification. The collection of fingerprints through optical devices is based on optical imaging the finger surface through optical lenses. In addition, an image sensing chip is also required for the collection of fingerprints and built in the optical device. Due to the optical lenses and the image sensing chip, the size of the optical device has some limitations. For example, since the object distance and the image distance of the optical device have minimum values, the thickness of the optical fingerprint collection device is limited and difficult to be reduced.

For convenient application, how to manufacture an optical device for fingerprint collection that has a small size and satisfactory sensing quality is one of the most important topics in the pertinent field.

SUMMARY OF THE INVENTION

Accordingly, the present invention is directed to an optical sensor device and a fingerprint sensor apparatus having small sizes and capable of providing good sensing quality.

An exemplary embodiment of the invention provides an optical sensor device. The optical sensor device includes a sensor layer, a microlens layer and a filter layer. The sensor layer includes a plurality of sensor areas, and is configured to sense a multi-wavelength light from a finger. The microlens layer includes a plurality of microlenses arranged in an array, and is disposed on the sensor layer. Each of the microlenses focuses the multi-wavelength light on a corresponding one of the sensor areas. The filter layer is disposed between the sensor layer and the microlens layer, and configured to filter the multi-wavelength light to generate a plurality of lights with different wavelengths.

In an exemplary embodiment of the invention, the filter layer includes a plurality of filter areas. Two adjacent filter areas filter the multi-wavelength light to generate two lights with different wavelengths.

In an exemplary embodiment of the invention, the filter areas are selected from at least two filters of a red filter, a green filter, a blue filter, and an infrared filter.

In an exemplary embodiment of the invention, the filter layer includes a plurality of filter areas, and the microlenses are individually arranged on the filter areas in a manner of one-to-one correspondence.

In an exemplary embodiment of the invention, the filter areas are individually arranged on the sensor areas in the manner of one-to-one correspondence.

In an exemplary embodiment of the invention, a center of an orthographic projection of each of the microlenses on the filter layer has an offset distance relative to a center of the filter area that the each of the microlenses corresponds.

In an exemplary embodiment of the invention, an orthographic projection of each of the filter areas on the sensor layer covers at least two sensor areas.

In an exemplary embodiment of the invention, the optical sensor device further includes an aperture layer. The aperture layer includes a plurality of apertures, and is disposed between the sensor layer and the filter layer. The apertures respectively transmit the lights generated by the filter layer to the sensor layer.

Another exemplary embodiment of the invention provides a fingerprint sensor apparatus includes a first substrate, a light source, an optical sensor device, and a second substrate. The light source is disposed on the first substrate to output a multi-wavelength light. The optical sensor device is disposed on the first substrate. The optical sensor device includes a sensor layer, a microlens layer and a filter layer. The sensor layer includes a plurality of sensor areas, and is configured to sense a multi-wavelength light from a finger. The microlens layer includes a plurality of microlenses arranged in an array, and is disposed on the sensor layer. Each of the microlenses focuses the multi-wavelength light on a corresponding one of the sensor areas. The filter layer is disposed between the sensor layer and the microlens layer, and configured to filter the multi-wavelength light to generate a plurality of lights with different wavelengths. The second substrate is disposed above the optical sensor device. The second substrate is configured to contact the finger, and transmit the multi-wavelength light from the finger to the optical sensor device.

In an exemplary embodiment of the invention, the fingerprint sensor apparatus is selected from one of a transmissive fingerprint sensor apparatus and a reflective fingerprint sensor apparatus.

According to the above descriptions, in the exemplary embodiments of the invention, the filter layer is added between the sensor layer and the microlens layer for reducing interference lights of background. Accordingly, the optical sensor device including the filter layer has a small size and is capable of providing good sensing quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments are provided below to describe the disclosure in detail, though the disclosure is not limited to the provided embodiments, and the provided embodiments can be suitably combined. The term "coupling/coupled" and the phrase "electrically connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
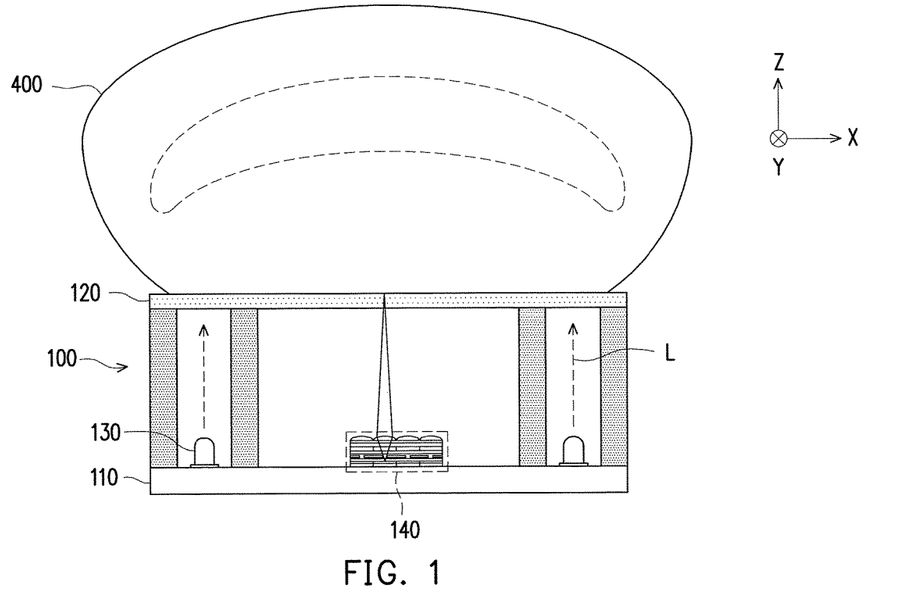
FIG. 1 illustrates a schematic diagram of a fingerprint sensor apparatus according to an embodiment of the invention.
Figure 2:
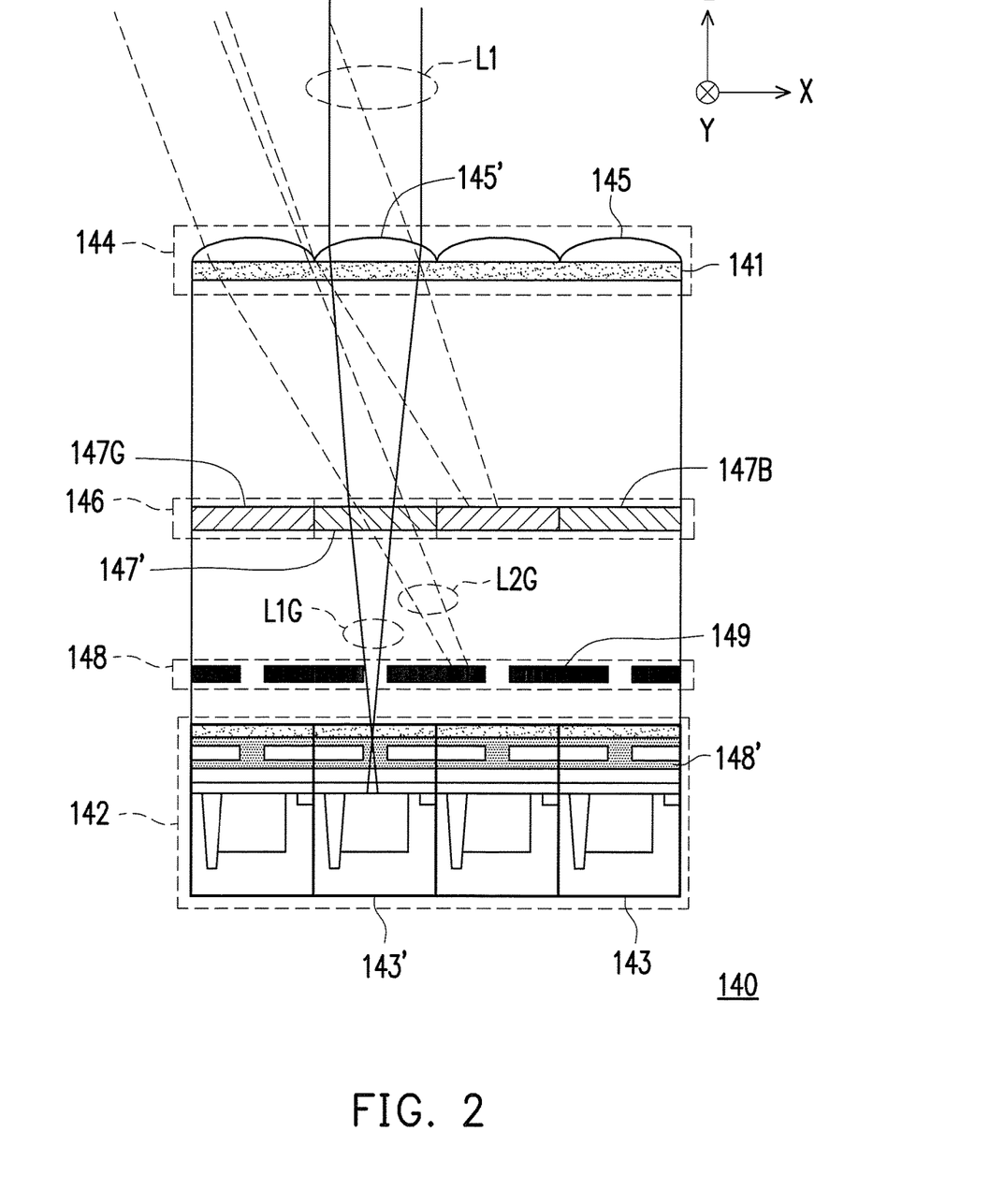
FIG. 2 illustrates a schematic diagram of an optical sensor device depicted in FIG. 1 according to an embodiment of the invention.

FIG. 1 illustrates a schematic diagram of a fingerprint sensor apparatus according to an embodiment of the invention. FIG. 2 illustrates a schematic diagram of an optical sensor device depicted in FIG. 1 according to an embodiment of the invention. Referring to FIG. 1 and FIG. 2, a fingerprint sensor apparatus 100 of the present embodiment includes a first substrate 110, a second substrate 120, a light source 130, and an optical sensor device 140. The light source 130 and the optical sensor device 140 are disposed on the first substrate 110. The second substrate 120 is opposite to the first substrate 110 and disposed above the light source 130 and the optical sensor device 140.

In the present embodiment, the light source 130 is adapted to provide a multi-wavelength light L. The light source 130 outputs the multi-wavelength light L for fingerprint sensing. The light source 130 may include light-emitting diodes (LEDs) or organic light-emitting diodes (OLEDs), and any light sources satisfying size requirements in actual design can be used, and the invention is not limited thereto. The multi-wavelength light L may include a white light combined from a plurality of colors or other colored lights such as infrared light, red light, green light, or blue light having a single wavelength range, and the invention is not limited thereto. However, the form of the light source 130 and the wavelength range and the light intensity of the multi-wavelength light L are not intended to limit the invention.

In the present embodiment, a finger 400 contacts the second substrate 120. The material of the second substrate 120 may be, but is not limited to resin, polymethylmethacrylate (PMMA), polycarbonate (PC), glass, and sapphire. The adjacent material around the second substrate 120 is usually air. In the present embodiment, the second substrate 120 transmits the multi-wavelength light L from the finger 400 to the optical sensor device 140. The optical sensor device 140 senses the multi-wavelength light L from the finger 400. The multi-wavelength light L may enter the finger 400, propagate inside the finger 400, and then transmit from the finger 400 to the optical sensor device 140. Alternatively, the multi-wavelength light L may be directly reflected by the finger 400 and transmit from the second substrate 120 to the optical sensor device 140. That is to say, the fingerprint sensor apparatus 100 is selected from one of a transmissive fingerprint sensor apparatus and a reflective fingerprint sensor apparatus. Nevertheless, the invention is not intended to limit the type or the structure of the fingerprint sensor apparatus 100.

Referring to FIG. 2, the optical sensor device 140 of the present embodiment includes a sensor layer 142, a microlens layer 144, a filter layer 146 and an aperture layer 148. The microlens layer 144 is disposed on the sensor layer 142. The filter layer 146 is disposed between the sensor layer 142 and the microlens layer 144. The aperture layer 148 is disposed between the sensor layer 142 and the filter layer 146.

To be specific, the sensor layer 142 may include a plurality of sensor areas 143 and be configured to sense the multi-wavelength light L from the finger 400 in the present embodiment. In an embodiment, the sensor layer 142 includes, for example, a charge coupled device image sensor (CCD image sensor) or a complementary metal oxide semiconductor (CMOS) image sensor or the like, which are not particularly limited by the present embodiment. The sensor areas 143 may be pixel cells of the CCD image sensor or the CMOS image sensor.

In the present embodiment, the microlens layer 144 includes a plurality of microlenses 145 arranged in an array. The microlens 145 is a small lens, generally with a diameter less than a millimeter (mm) and often as small as 10 micrometers (μm), but the invention is not limited thereto. The small sizes of the microlens 145 means that a simple design gives good optical quality. The microlens 145 of the present embodiment may be a single element with one plane surface and one spherical or aspherical convex surface to refract the multi-wavelength light L. In the present embodiment, each of the microlenses 145 focuses the multi-wavelength light L on a corresponding one of the sensor areas 143. For example, the microlenses 145' focuses the multi-wavelength light L1 on the sensor areas 143' that substantially locates right under the microlenses 145'. Because microlenses 145 are small, the substrate 141 that supports them is usually thicker than the microlenses 145. In an embodiment, several layers of optical material may be used to achieve design performance.

Figure 3:
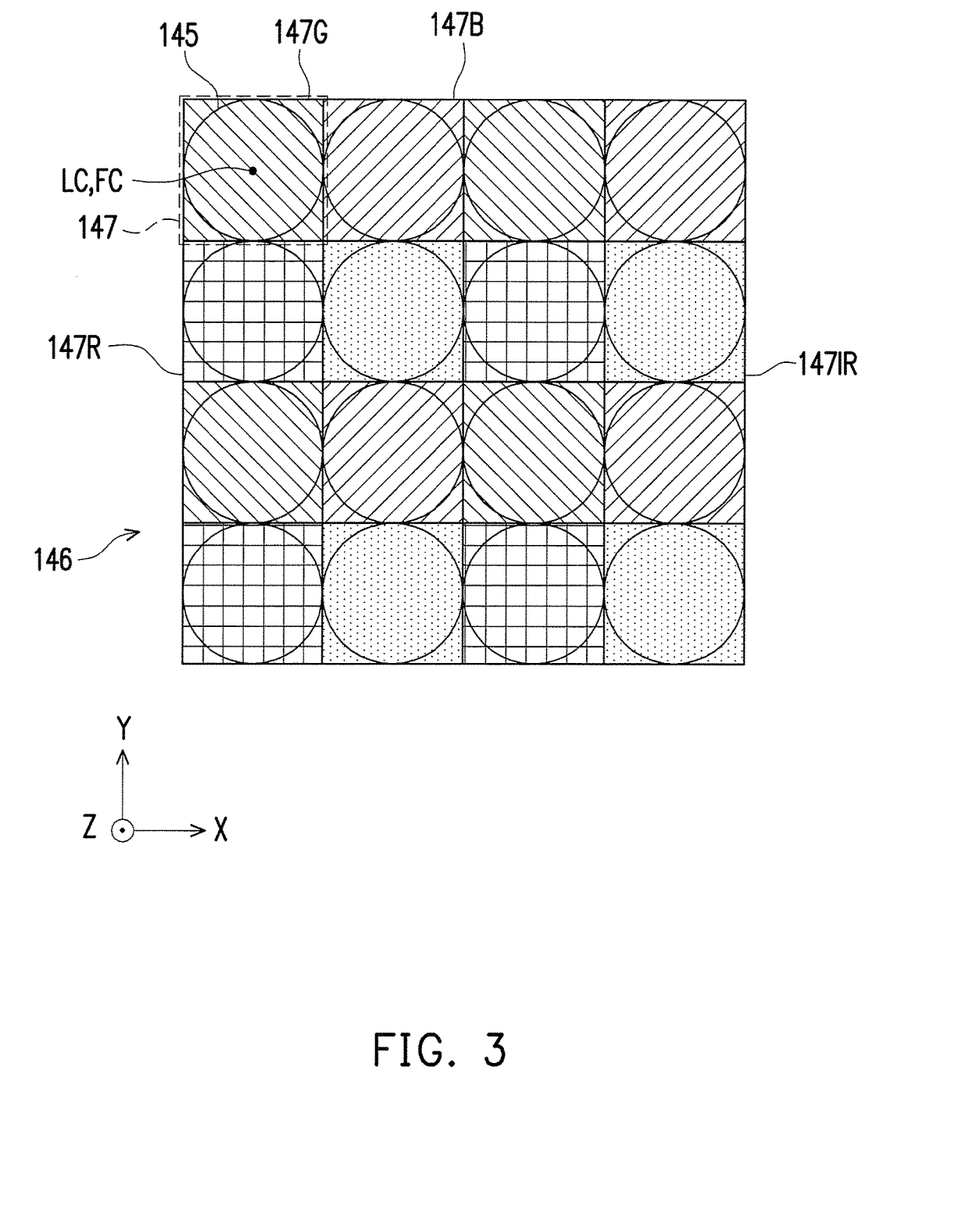
FIG. 3 illustrates a top view of the optical sensor device depicted in FIG. 2 according to an embodiment of the invention.

In the present embodiment, the filter layer 146 is configured to filter the multi-wavelength light L to generate a plurality of lights with different wavelengths. To be specific, the filter layer 146 of the present embodiment includes a plurality of filter areas 147 for reducing interference lights of background as illustrated in FIG. 3. FIG. 3 illustrates a top view of the optical sensor device depicted in FIG. 2 according to an embodiment of the invention. Referring to FIG. 2 and FIG. 3, the filter layer 146 of the present embodiment includes red filters 147R, green filters 147G, blue filters 147B, and infrared filters 147IR. In other words, the filter areas 147 are selected from at least two filters of the red filter, the green filter, the blue filter, and the infrared filter. In the present embodiment, two adjacent filter areas 147 filter the multi-wavelength light L to generate two lights with different wavelengths. For example, the green filter 147G filters the multi-wavelength light L to generate a green light, and the adjacent blue filter 147B filters the multi-wavelength light L to generate a blue light. In addition, another red filter 147R adjacent to the green filter 147G filters the multi-wavelength light L to generate a red light. The generation of other lights with different wavelengths may be deduced by analogy, and it will not further described herein.

In the present embodiment, the microlenses 145 are individually arranged on the filter areas 147 in a manner of one-to-one correspondence, and the filter areas 147 are also individually arranged on the sensor areas 143 in the manner of one-to-one correspondence. For example, the microlens 145' is arranged on the filter area 147', and the filter area 147' is also arranged on the sensor area 143' as illustrated in FIG. 2. In addition, in the present embodiment, a center LC of an orthographic projection of each of the microlenses 145 on the filter layer 146 substantially overlaps with a center FC of the filter area 147 that each of the microlenses 145 corresponds, but the invention is not limited thereto. In another embodiment, the center of the orthographic projection of each of the microlenses on the filter layer has an offset distance relative to the center of the filter area that each of the microlenses corresponds.

In the present embodiment, the aperture layer 148 includes a plurality of apertures 149 for reducing interference lights of background. The apertures 149 respectively transmit the lights generated by the filter layer 146 to the sensor layer 142. In FIG. 2, the apertures 149 transmit the green light L1G to the sensor area 143', and block the green light L2G. In the present embodiment, another aperture layer 148' may be included in the sensor layer 142 for reducing interference lights of background. The arrangement of the aperture layer 148' is optional, and the invention is not limited thereto.

In the present embodiment, the numbers of the microlenses 145, the filter areas 147, the apertures 149 and the sensor areas 143 are exemplarily disclosed for description. Nevertheless, the invention is not intended to limit the numbers of the microlenses 145, the filter areas 147, the apertures 149 and the sensor areas 143.

Figure 4:
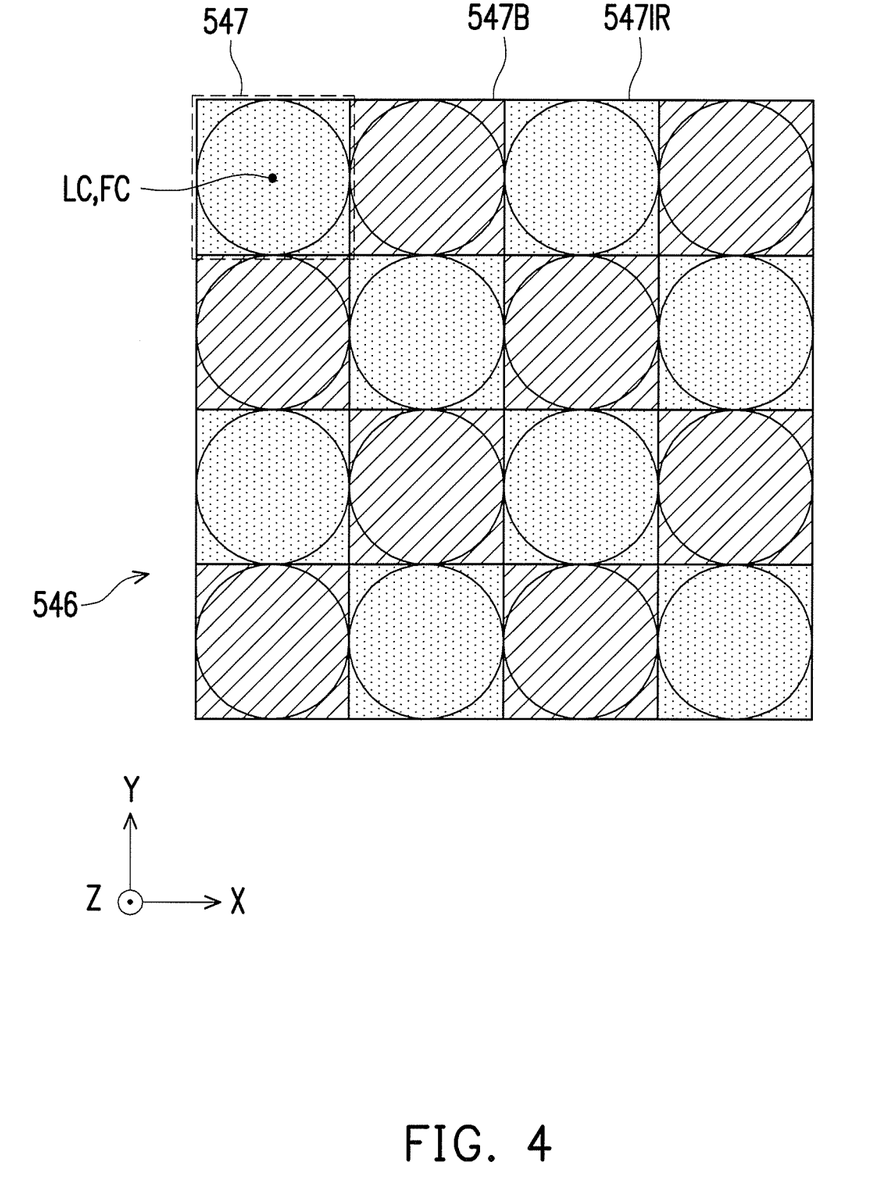
FIG. 4 illustrates a top view of the optical sensor device depicted in FIG. 2 according to another embodiment of the invention.

FIG. 4 illustrates a top view of the optical sensor device depicted in FIG. 2 according to another embodiment of the invention. Referring to FIG. 2 to FIG. 4, the filter layer 546 of the present embodiment is similar to the filter layer 146 depicted in FIG. 3, and the main difference therebetween, for example, lies in that the filter layer 546 simply includes filters of two colors, such as blue filters 547B and infrared filters 547IR, but the invention is not limited thereto. The operation of the filter layer 546 described in this embodiment of the invention is sufficiently taught, suggested, and embodied in the embodiments illustrated in FIG. 3, and therefore no further description is provided herein.

Figure 5:
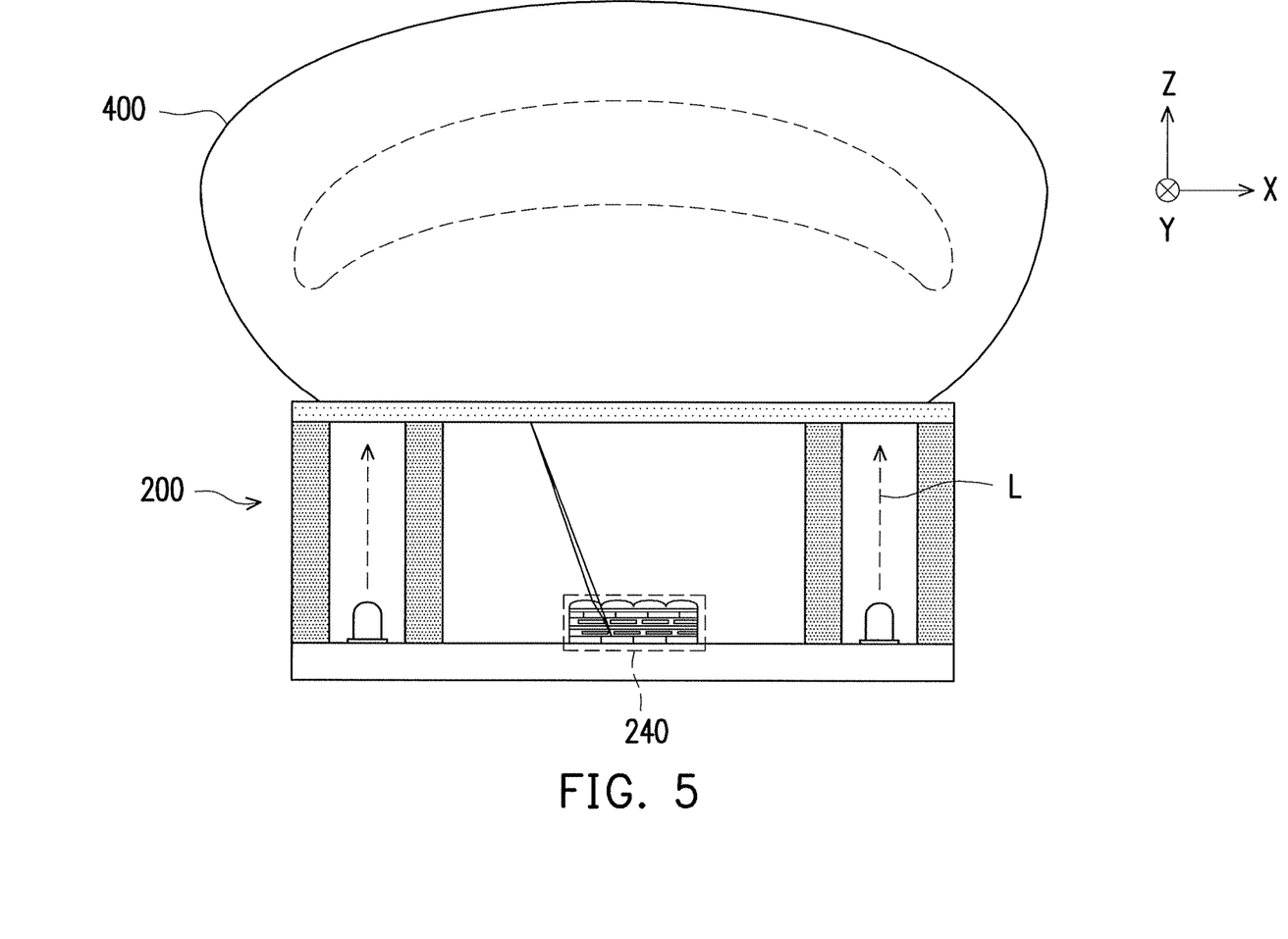
FIG. 5 illustrates a schematic diagram of a fingerprint sensor apparatus according to another embodiment of the invention.
Figure 6:
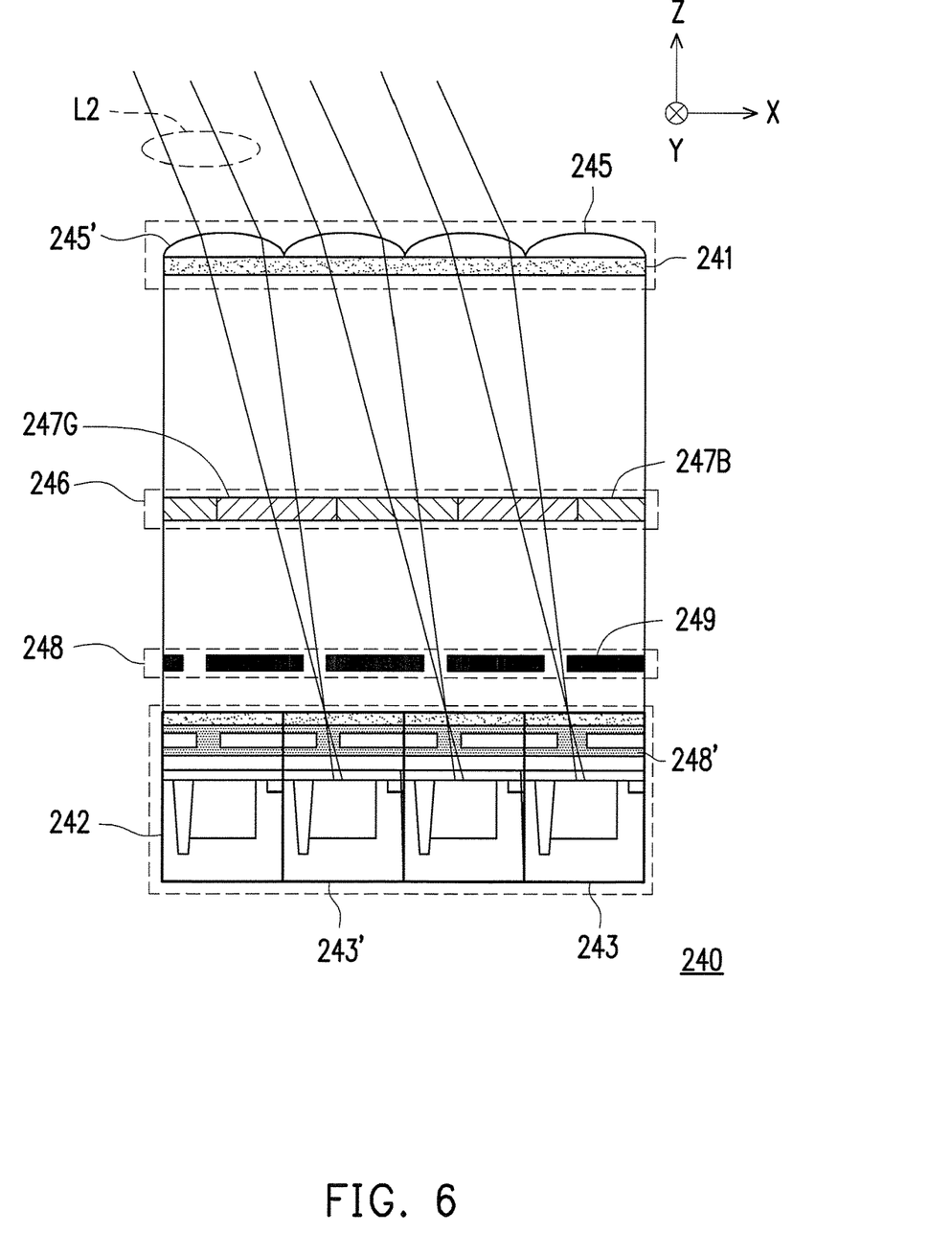
FIG. 6 illustrates a schematic diagram of an optical sensor device depicted in FIG. 5 according to an embodiment of the invention.
Figure 7:
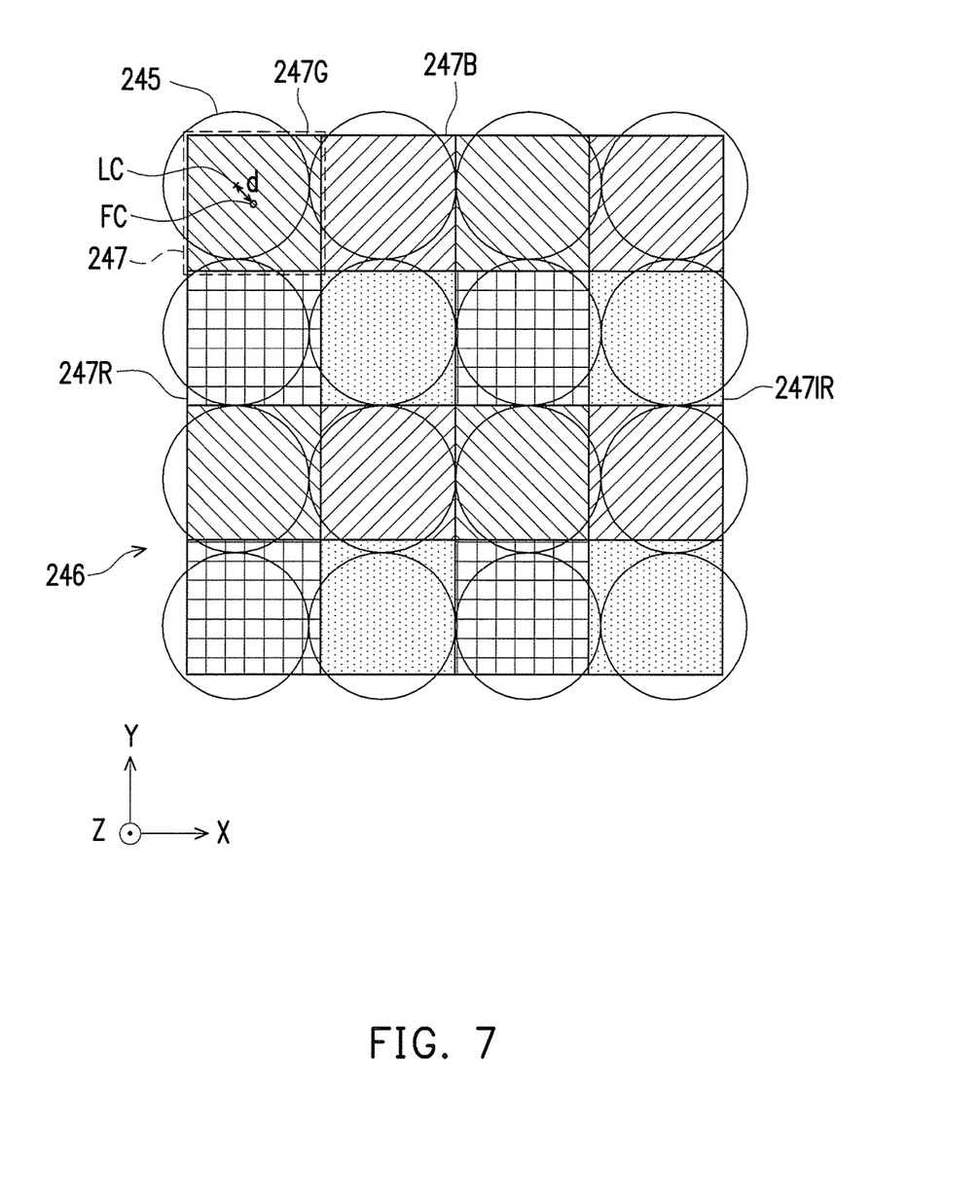
FIG. 7 illustrates a top view of the optical sensor device depicted in FIG. 6 according to an embodiment of the invention.

FIG. 5 illustrates a schematic diagram of a fingerprint sensor apparatus according to another embodiment of the invention. FIG. 6 illustrates a schematic diagram of an optical sensor device depicted in FIG. 5 according to an embodiment of the invention. FIG. 7 illustrates a top view of the optical sensor device depicted in FIG. 6 according to an embodiment of the invention. Referring to FIG. 5 to FIG. 7, the optical sensor device 240 of the present embodiment is similar to the optical sensor device 140 depicted in FIG. 2. The main difference therebetween, for example, lies in that the filter layer 246 and the aperture layer 248 have offset distances relative to the sensor layer 242. Due to the offset distances, the optical sensor device 240 may sense oblique lights from the finger 400. For example, the sensor area 243' senses the oblique light L2 that transmits from the microlens 245' to the sensor area 243'. Since the oblique lights are sensed by the sensor layer 242, the smaller optical sensor device of the present embodiment 240 senses a larger fingerprint area.

To be specific, further referring to FIG. 7, a center LC of an orthographic projection of each of the microlenses 245 on the filter layer 246 has an offset distance d relative to a center FC of the filter area 247 that each of the microlenses 245 corresponds. In the present embodiment, the offset direction of the center LC relative to the center FC is the upper left direction, but the invention is not limited thereto. In an embodiment, the offset direction may be the bottom right direction or any oblique or normal direction X or Y relative to the center FC. Nevertheless, the invention is not intended to limit the offset direction of the center LC relative to the center FC.

The operation of the optical sensor device 240 described in this embodiment of the invention is sufficiently taught, suggested, and embodied in the embodiments illustrated in FIG. 2, and therefore no further description is provided herein. Furthermore, in the present embodiment, the microlenses 245 are individually arranged on the sensor areas 243 in the manner of one-to-one correspondence, and each of the microlenses 245 substantially locates above the sensor area 243 that each of the microlenses corresponds.

Figure 8:
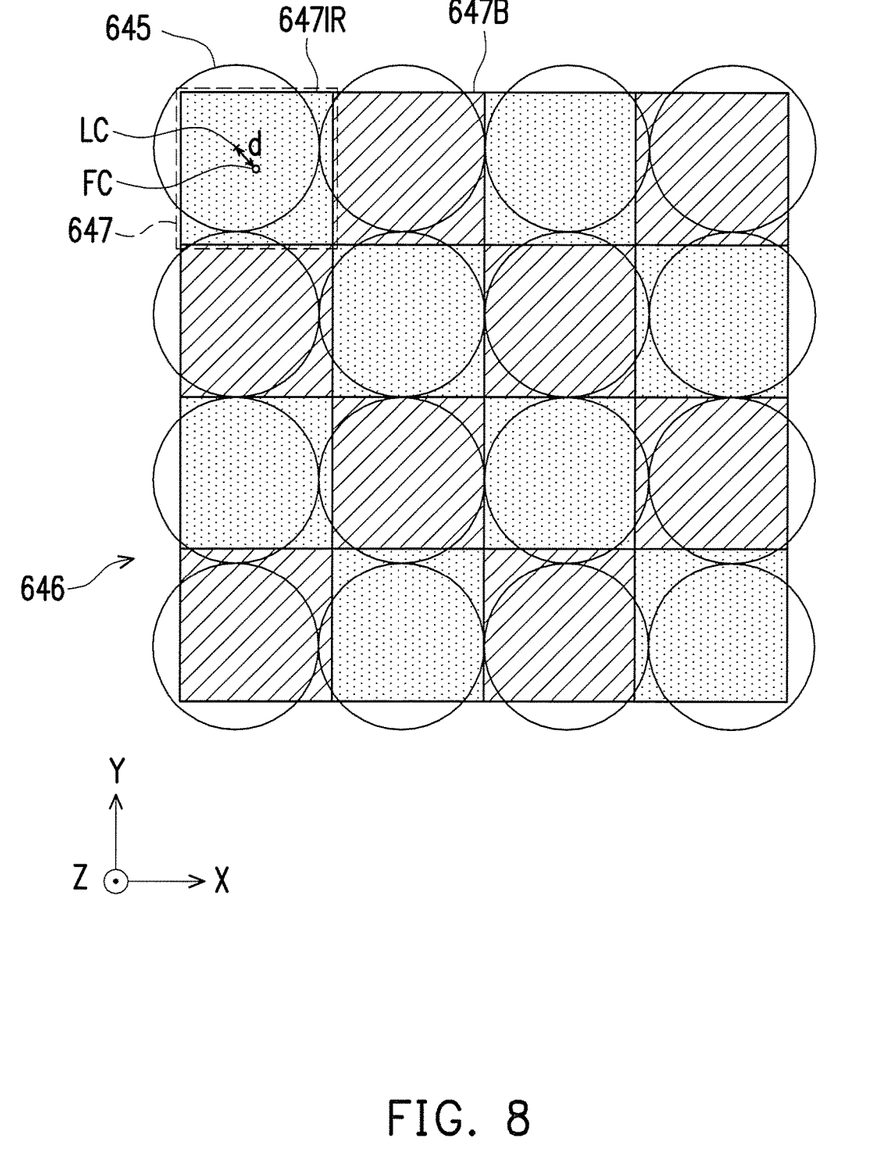
FIG. 8 illustrates a top view of the optical sensor device depicted in FIG. 6 according to another embodiment of the invention.

FIG. 8 illustrates a top view of the optical sensor device depicted in FIG. 6 according to another embodiment of the invention. Referring to FIG. 6 to FIG. 8, the filter layer 646 of the present embodiment is similar to the filter layer 246 depicted in FIG. 7, and the main difference therebetween, for example, lies in that the filter layer 646 simply includes filters of two colors, such as blue filters 647B and infrared filters 647IR, but the invention is not limited thereto. The operation of the filter layer 646 described in this embodiment of the invention is sufficiently taught, suggested, and embodied in the embodiments illustrated in FIG. 7, and therefore no further description is provided herein.

Figure 9:
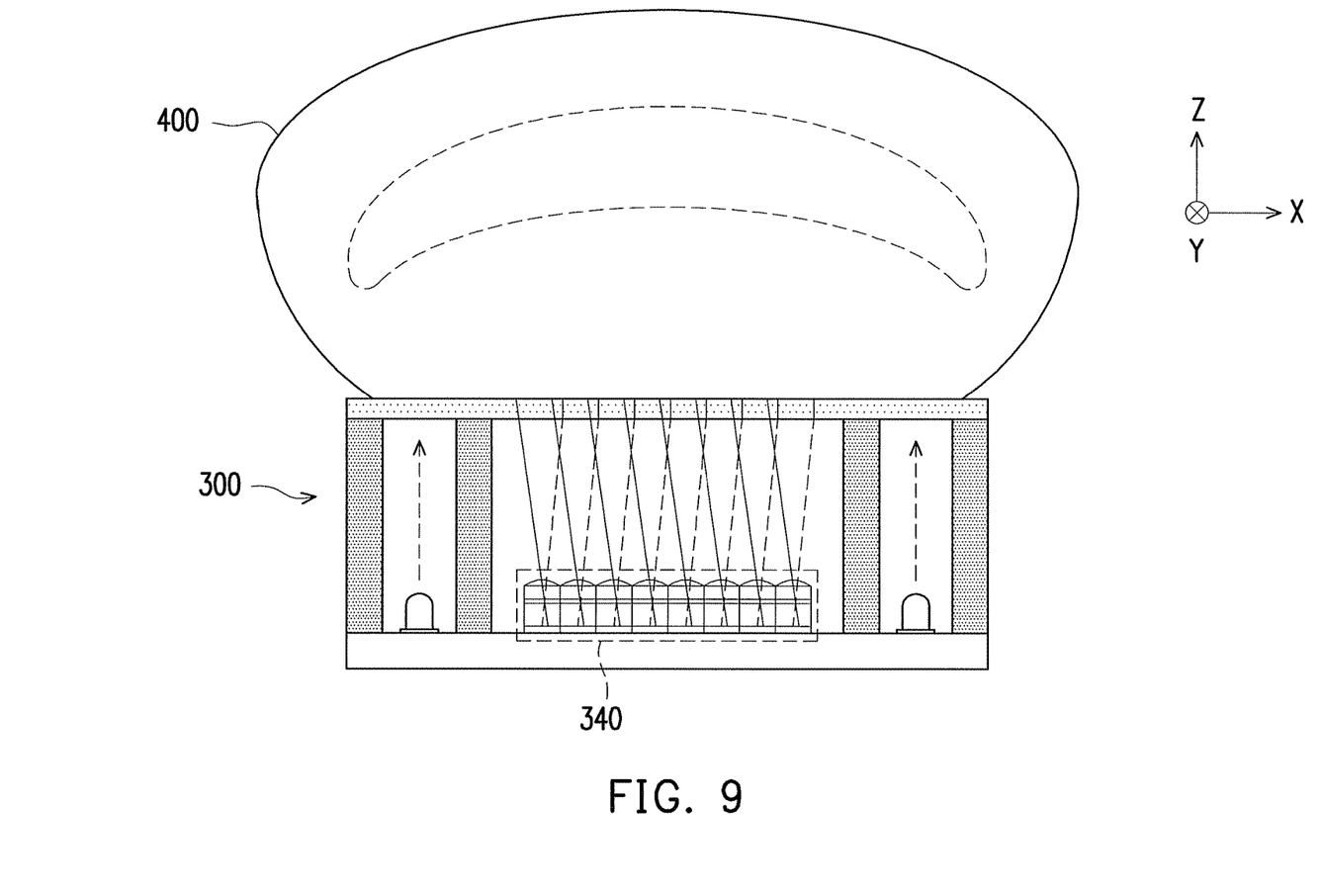
FIG. 9 illustrates a schematic diagram of a fingerprint sensor apparatus according to another embodiment of the invention.
Figure 10:
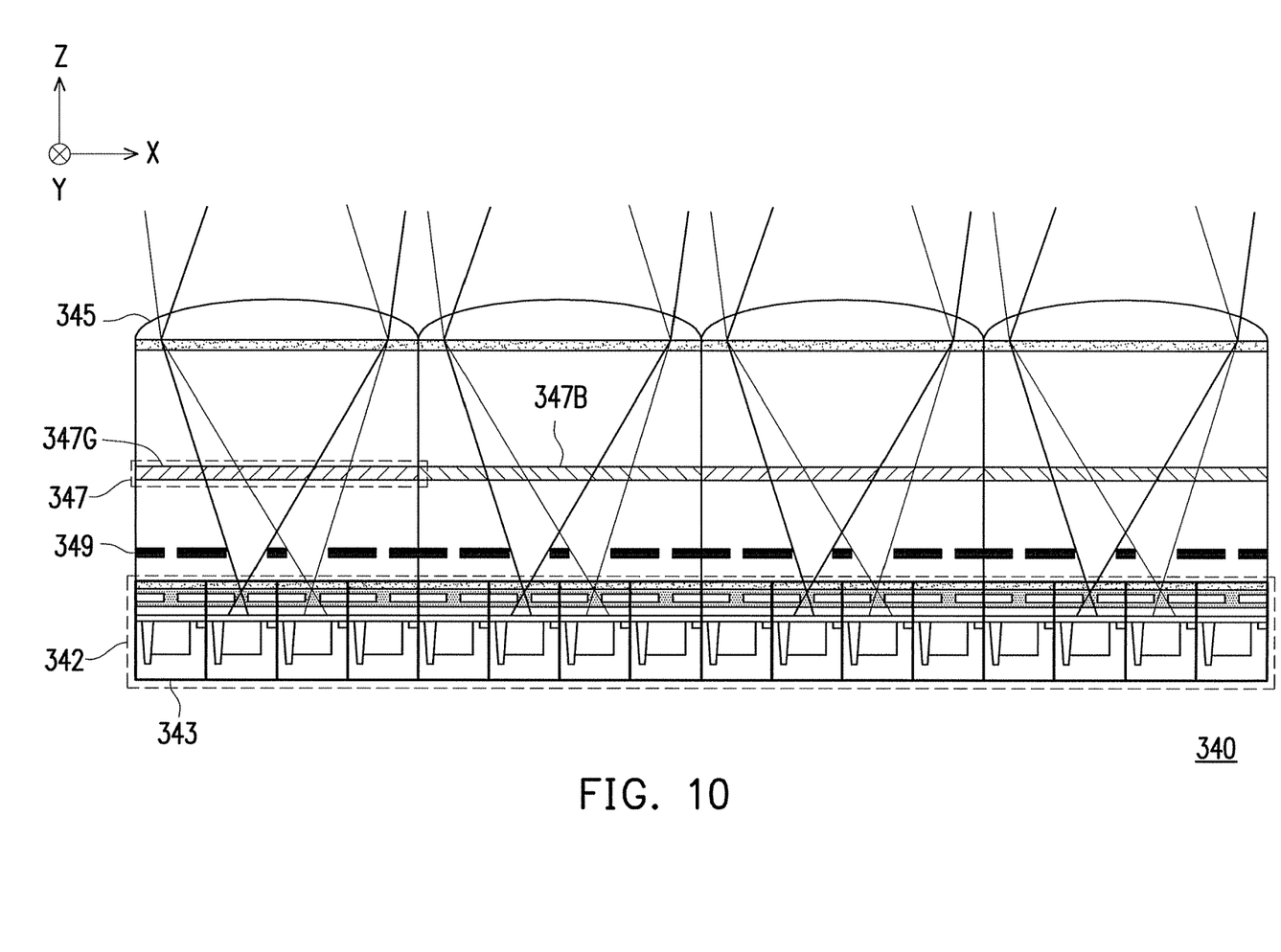
FIG. 10 illustrates a schematic diagram of an optical sensor device depicted in FIG. 9 according to an embodiment of the invention.

FIG. 9 illustrates a schematic diagram of a fingerprint sensor apparatus according to another embodiment of the invention. FIG. 10 illustrates a schematic diagram of an optical sensor device depicted in FIG. 9 according to an embodiment of the invention. Referring to FIG. 2, FIG. 9 and FIG. 10, the optical sensor device 340 of the present embodiment is similar to the optical sensor device 140 depicted in FIG. 2. The main difference therebetween, for example, lies in that an orthographic projection of each of the filter areas 347 on the sensor layer 342 covers at least two sensor areas 343. In the present embodiment, one filter area 347G or 347B covers four sensor areas 343, but the number of the covered sensor areas 343 by the one filter area 347G or 347B is exemplarily disclosed for description. Nevertheless, the invention is not intended to limit the number of the covered sensor areas.

The operation of the optical sensor device 340 described in this embodiment of the invention is sufficiently taught, suggested, and embodied in the embodiments illustrated in FIG. 1 to FIG. 4, and therefore no further description is provided herein. Furthermore, in the present embodiment, the microlenses 345 are individually arranged on the sensor areas 343, and each of the microlenses 345 substantially locates above the filter area 347.

In summary, in the exemplary embodiments of the invention, the filter layer is added between the sensor layer and the microlens layer, and filters the multi-wavelength light to generate the lights with different wavelengths for reducing interference lights of background. For a light with a certain wavelength, the filter layer provides a diaphragm effect, such that interference lights between the microlenses is also reduced. Therefore, the optical sensor device including the filter layer has a small size and is capable of providing good sensing quality. In addition, the filter layer of the optical sensor device is design to have filter areas of different colors or patterns and thus adapted for various fingerprint sensor apparatuses that include different light sources.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical sensor device, comprising:
   a sensor layer, comprising a plurality of sensor areas, and configured to sense a multi-wavelength light from a finger;
   a microlens layer, comprising a plurality of microlenses arranged in an array, and disposed on the sensor layer, wherein each of the microlenses focuses the multi-wavelength light on a corresponding one of the sensor areas; and
   a filter layer, disposed between the sensor layer and the microlens layer, and comprising a plurality of filter areas, wherein at least two of the filter areas have different configurations, and the filter areas filter the multi-wavelength light to generate a plurality of lights in different wavelength ranges,
   wherein the microlenses are individually arranged on the filter areas in a manner of one-to-one correspondence, and a center of an orthographic projection of each of the microlenses on the filter layer has an offset distance relative to a center of the filter area that the each of the microlenses corresponds.

2. The optical sensor device according to claim 1, wherein two adjacent filter areas filter the multi-wavelength light to generate two lights with different wavelengths.

3. The optical sensor device according to claim 2, wherein the filter areas are selected from at least two filters of a red filter, a green filter, a blue filter, and an infrared filter.

4. The optical sensor device according to claim 1, wherein the filter areas are individually arranged on the sensor areas in the manner of one-to-one correspondence.

5. The optical sensor device according to claim 1, wherein an orthographic projection of each of the filter areas on the sensor layer covers at least two sensor areas.

6. The optical sensor device according to claim 1, further comprising:
   an aperture layer, comprising a plurality of apertures, and disposed between the sensor layer and the filter layer, wherein the apertures respectively transmit the lights generated by the filter layer to the sensor layer.

7. A fingerprint sensor apparatus, comprising:
   a first substrate;
   a light source, disposed on the first substrate to output a multi-wavelength light;
   an optical sensor device, disposed on the first substrate, and comprising:
   a sensor layer, comprising a plurality of sensor areas, and configured to sense the multi-wavelength light from a finger;
   a microlens layer, comprising a plurality of microlenses arranged in an array, and disposed on the sensor layer, wherein each of the microlenses focuses the multi-wavelength light on a corresponding one of the sensor areas; and
   a filter layer, disposed between the sensor layer and the microlens layer, and comprising a plurality of filter areas, wherein at least two of the filter areas have different configurations, and the filter areas filter the multi-wavelength light to generate a plurality of lights in different wavelength ranges; and
   a second substrate, disposed above the optical sensor device, and configured to contact the finger, and transmit the multi-wavelength light from the finger to the optical sensor device,
   wherein the microlenses are individually arranged on the filter areas in a manner of one-to-one correspondence, and a center of an orthographic projection of each of the microlenses on the filter layer has an offset distance relative to a center of the filter area that the each of the microlenses corresponds.

8. The fingerprint sensor apparatus according to claim 7, wherein two adjacent filter areas filter the multi-wavelength light to generate two lights with different wavelengths.

9. The fingerprint sensor apparatus according to claim 8, wherein the filter areas are selected from at least two filters of a red filter, a green filter, a blue filter, and an infrared filter.

10. The fingerprint sensor apparatus according to claim 7, wherein the filter areas are individually arranged on the sensor areas in the manner of one-to-one correspondence.

11. The fingerprint sensor apparatus according to claim 7, wherein an orthographic projection of each of the filter areas on the sensor layer covers at least two sensor areas.

12. The fingerprint sensor apparatus according to claim 7, wherein the optical sensor device further comprises:
   an aperture layer, comprising a plurality of apertures, and disposed between the sensor layer and the filter layer, wherein the apertures respectively transmit the lights generated by the filter layer to the sensor layer.

13. The fingerprint sensor apparatus according to claim 7, wherein the fingerprint sensor apparatus is selected from one of a transmissive fingerprint sensor apparatus and a reflective fingerprint sensor apparatus.

* * * * *